(12) United States Patent
Ogerly et al.

(10) Patent No.: US 8,936,053 B2
(45) Date of Patent: Jan. 20, 2015

(54) BRAKE FILL TOOL

(75) Inventors: Shannon Ogerly, Lincoln, AL (US); Masakazu Adachi, Birmingham, AL (US)

(73) Assignee: Honda Motor Co., Ltd., Tokyo (JP)

( * ) Notice: Subject to any disclaimer, the term of this patent is extended or adjusted under 35 U.S.C. 154(b) by 966 days.

(21) Appl. No.: 13/075,660

(22) Filed: Mar. 30, 2011

(65) Prior Publication Data

US 2012/0247615 A1 Oct. 4, 2012

(51) Int. Cl.
*B65B 1/04* (2006.01)
*B60T 17/22* (2006.01)
*B60T 17/06* (2006.01)

(52) U.S. Cl.
CPC .............. *B60T 17/222* (2013.01); *B60T 17/06* (2013.01)
USPC ................. 141/385; 141/7; 141/59; 141/368; 188/352

(58) Field of Classification Search
CPC ................................ B60T 17/00; B60T 17/06
USPC ................. 141/7, 59, 368, 383–385; 188/352
See application file for complete search history.

(56) References Cited

U.S. PATENT DOCUMENTS

| 4,017,329 | A | 4/1977 | Larson |
| 4,170,280 | A | 10/1979 | Schwarz |
| 4,959,960 | A | 10/1990 | LaFountain |
| 5,060,703 | A | 10/1991 | Koerner |
| 5,088,529 | A | 2/1992 | Jones et al. |
| 7,784,504 | B2 * | 8/2010 | Freed et al. ............. 141/312 |
| 8,230,889 | B2 * | 7/2012 | Pratt et al. ............. 141/368 |

FOREIGN PATENT DOCUMENTS

| DE | 3633872 C1 | 10/1987 |
| JP | 63195058 A | 8/1988 |
| JP | 4005160 A | 1/1992 |
| JP | 11129891 A | 5/1999 |

* cited by examiner

*Primary Examiner* — Jason K Niesz
(74) *Attorney, Agent, or Firm* — Rankin, Hill & Clark LLP

(57) ABSTRACT

A brake fill tool for filling a brake housing in a braking system on a vehicle includes a nozzle housing having a nozzle for filling a reservoir chamber of the brake housing, a manual clamping mechanism connected to the nozzle housing that selectively clamps the nozzle to the brake housing, and a pressurized sealing mechanism that is connected to the nozzle housing. The pressurized sealing mechanism selectively seals the nozzle to the brake reservoir after the manual clamping mechanism clamps the nozzle to the brake housing.

19 Claims, 9 Drawing Sheets

BRAKE FILL TOOL

BACKGROUND

Exemplary embodiments herein relate to a clamping and filling tool, and more particularly to a brake clamping and filling tool for a vehicle.

During the manufacturing of vehicles, many fluids must be added to the vehicle before the vehicle can be safely operated. For example, a plurality of fluids must be added to the vehicle engine, transmission, steering system, cooling system, and braking system. These fluids could include engine oil, transmission fluid, power steering fluid, antifreeze solution, and brake fluid. To ensure that the proper amount of fluid is introduced into these systems, the process may be partially automated with a filling tool. The filling tool also ensures that the fluid is added to the systems in a rapid manner. Based upon the type of system into which the fluid is being introduced, it may be desirable for atmospheric air to be removed from the system prior to the introduction of the fluid.

When introducing the fluid into the system or when evacuating the atmospheric air from the system prior to filling, it may be desirable for there to be a leakproof connection maintained between the filling tool and the system being filled. As can be imagined, a great torsional force may be required in order to ensure proper sealing between the filling tool and the system. When this connection is manually initiated by an individual, difficulties may be encountered. Specifically, repeated twisting action by the individual to tighten the filling tool onto the system can cause repetitive stress injuries to the individual. Further, there is the risk that the individual may not apply sufficient torque to the filling tool to ensure a leakproof connection between the filling tool and the system, thereby allowing a fluid leak to occur.

As can also be appreciated, these systems that require fluid may have different diameter filling ports. As such, new filling tools must be created for filling these different sized ports. These filling tools require valuable space in the manufacturing facility. Further, each additional filling tool provides an additional opportunity for a malfunction.

The statements of the above section merely provide background information related to the present disclosure and may not constitute prior art.

BRIEF DESCRIPTION

According to one aspect, a brake fill tool for filling a brake housing in a braking system on a vehicle includes a nozzle housing having a nozzle for filling a reservoir chamber of the brake housing, a manual clamping mechanism connected to the nozzle housing that selectively clamps the nozzle to the brake housing, and a pressurized sealing mechanism that is connected to the nozzle housing. The pressurized sealing mechanism selectively seals the nozzle to the brake housing after the manual clamping mechanism clamps the nozzle to the brake housing.

According to another aspect, a method of filling a brake housing in a braking system on a vehicle includes filling a reservoir chamber of the brake housing with a nozzle housing having a nozzle, connecting the nozzle to the brake housing with a manual clamping mechanism, and sealing the nozzle to the brake housing after the manual clamping mechanism clamps the housing to the brake reservoir.

DETAILED DESCRIPTION

Figure 1:
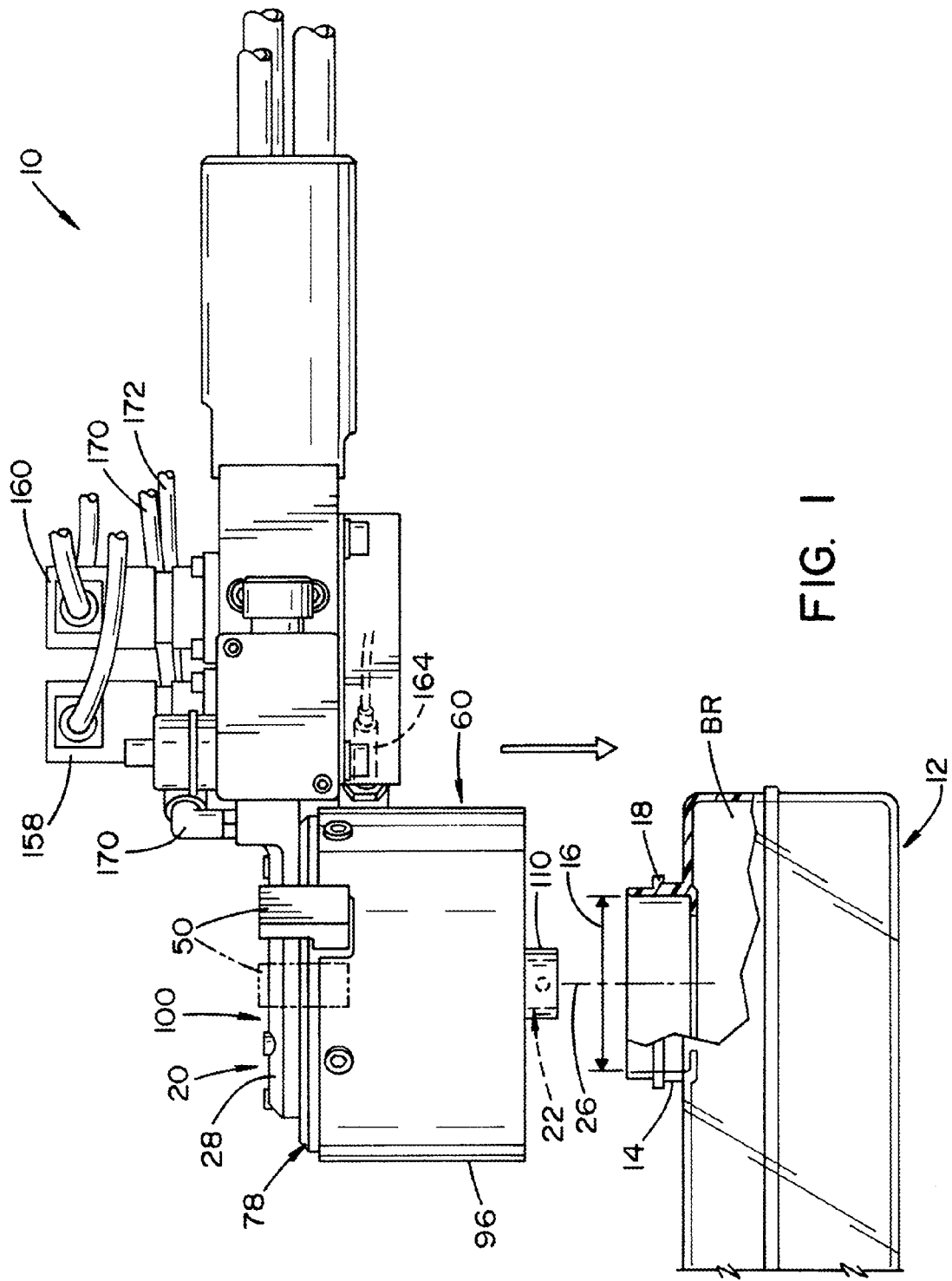
FIG. 1 is an elevation view of a brake fill tool aligned with a brake housing.

Referring now to the drawings, wherein they are for purposes of illustrating one or more exemplary embodiments and not for purposes of limiting same, FIGS. 1-8 illustrate a brake fill tool 10 of the present application.

It should, of course, be understood that the descriptions and drawings herein are merely illustrative and that various modifications and changes can be made in the structures disclosed without departing from the present disclosure. It will also be appreciated that various identified components of the brake fill tool disclosed herein are merely terms of art and may vary from one manufacturer to another and should not be deemed to limit the present disclosure. All references to direction and position, unless otherwise indicated, refer to the orientation of the brake fill tool illustrated in the drawings and should not be construed as limiting the claims appended hereto. Like numerals refer to like parts throughout the several views.

As shown in FIG. 1, a brake fill tool 10 is aligned with a brake housing 12. The brake housing 12 includes a neck 14 that defines an inner diameter 16. The brake housing 12 also includes a lip 18 that circumferentially extends around the neck 14 and is clampingly gripped by the brake fill tool 10 as will be discussed hereinafter. The brake housing 12 defines a brake reservoir BR for the receipt of brake fluid. The brake housing 12 may be made of plastic or any number of metals as is known in the art. The neck 14 has a generally circular cross-section and the lip 18 can be a component of a threaded connection for subsequent installation of a sealing cap (not shown). As illustrated and subsequently described, the housing 12 is referred to as a brake housing. However, it is understood that the present disclosure could be applicable to any type of system in which it is desirable to have a device and method for adding and/or removing fluid.

Figure 3:
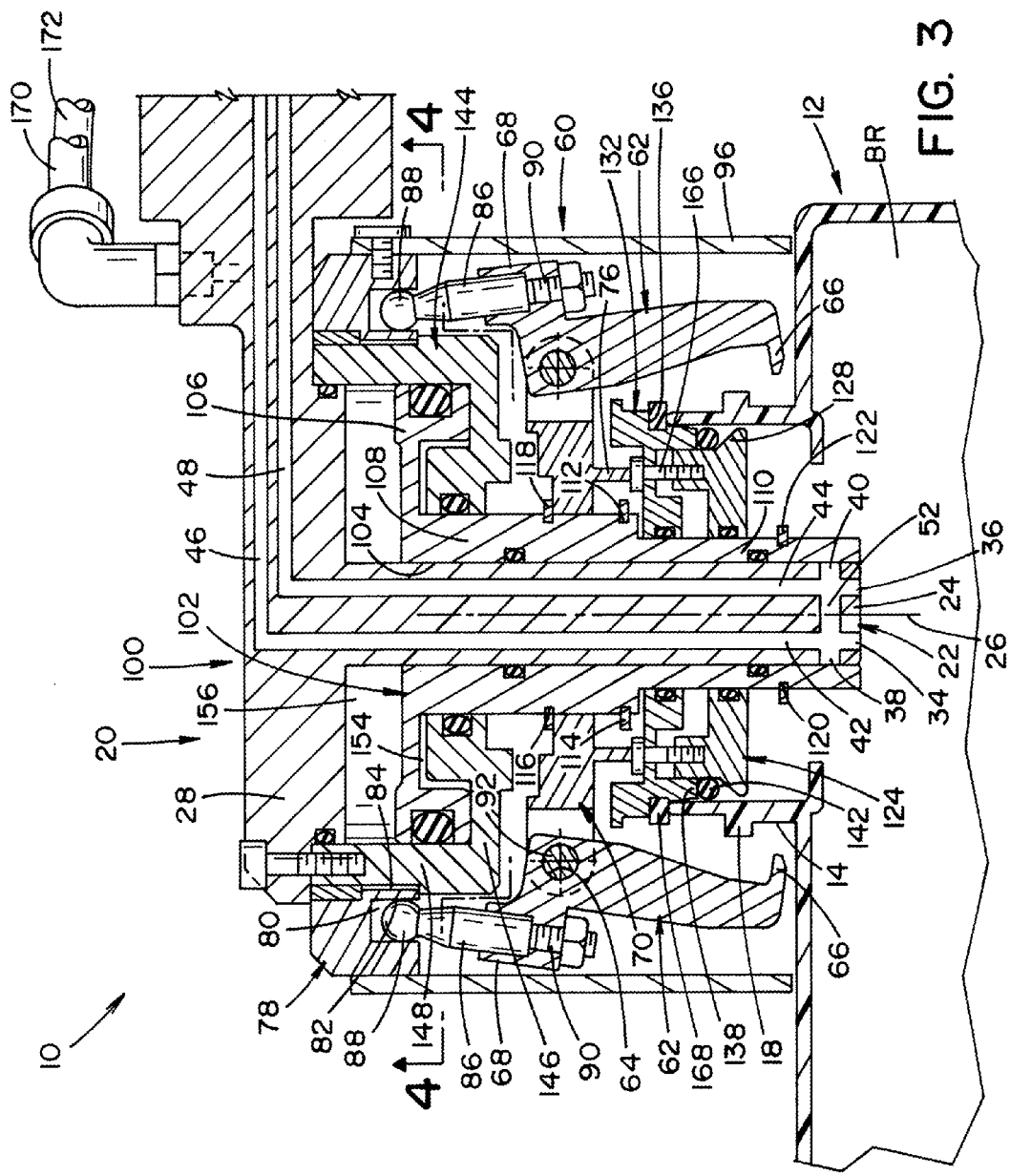
FIG. 3 is a sectional view of the brake fill tool in an unclamped position on the brake housing.

Before entering into a detailed discussion of all of the components of the brake fill tool 10, a brief overview of the stages of operation of the brake fill tool 10 will be provided so that a basic understanding of the operation of the brake fill tool 10 can be gained. As shown in FIG. 3, the brake fill tool 10 is in the unclamped position. In this position, a portion of a nozzle housing 20 and its related components are at least partially inserted into the neck 14 of the brake housing 12. Further, a manual clamping mechanism 60 is in an open position and is not grasping the lip 18 of the brake housing 12. Further still, a pressurized sealing mechanism 100 has not been retracted so as to provide a sealed connection between the brake housing 12 and the brake fill tool 10. Thus, the brake fill tool 10 is not clamped or sealed to the brake housing 12 in FIG. 3.

Figure 5:
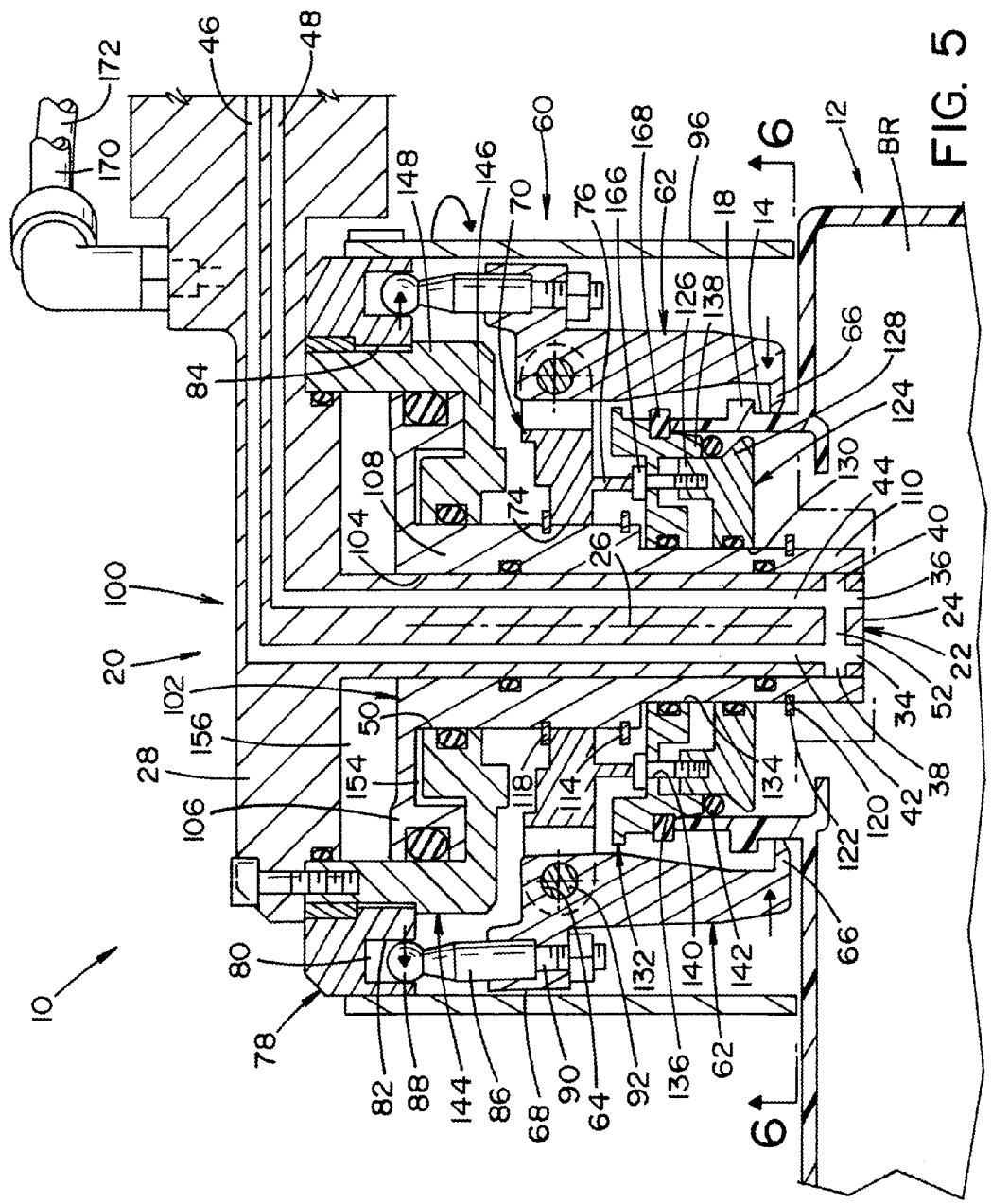
FIG. 5 is a sectional view of the brake fill tool similar to FIG. 3, but shown in a clamped position on the brake housing with a piston of the brake fill tool in a first position.

With reference to FIG. 5, the brake fill tool 10 is shown in a clamped position. In this position, the nozzle housing 20 remains in the same location as FIG. 3. Further, the pressurized sealing mechanism 100 is in the same position as in FIG. 3. However, the manual clamping mechanism 60 has clamped the neck 14 of the brake housing 12.

Figure 7:
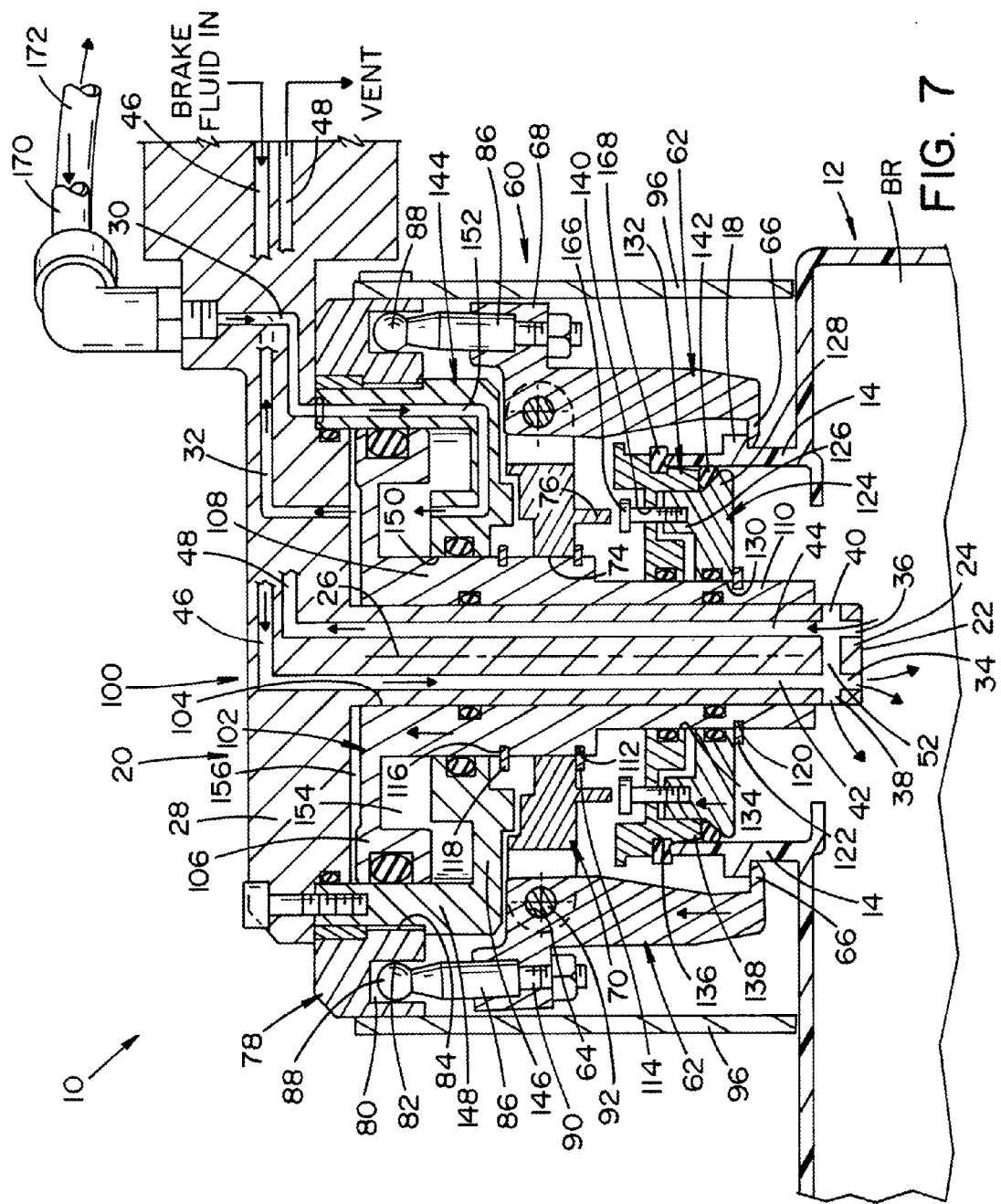
FIG. 7 is a sectional view of the brake fill tool similar to FIG. 5, but shown in a ready position on the brake housing with the piston moved to a second sealing position.

Turning now to FIG. 7, the brake fill tool 10 is shown in the ready position. The nozzle housing 20 is in the same position as FIGS. 3 and 5. The manual clamping mechanism 60 has been retracted so as to fully engage the lip 18 of the brake housing 12. Further, the pressurized sealing mechanism 100 is retracted. Thus, the brake fill tool 10 is clamped and sealed to the brake housing 12 and the addition/removal of fluid to the brake housing may commence.

The structure of the brake fill tool 10 will now be described. With reference to FIGS. 3, 5, and 7, the nozzle housing 20 can include a nozzle 22 with a free end 24. The nozzle 22 defines a central vertical axis 26. The nozzle housing 20 can also include a top wall 28 from which the nozzle 22 extends. The nozzle housing 20 may be made of any number of metallic and/or polymer materials that provide sufficient strength and resistance to deformation. It is desirable for the nozzle housing to be made of a material that is resistant to corrosion caused by brake fluid.

As illustrated, the nozzle 22 is circular in cross-section, but other shapes are possible and contemplated. The nozzle 22 may be integral with the top wall 28, or they may be separate. The nozzle 22 can be used to fill and remove the brake housing 12 with brake fluid.

With reference to FIGS. 3, 5, and 7, the nozzle 22 can define primary and secondary filling ports 34, 38 and primary and secondary draining ports 36, 40 at the free end 24. The primary filling port 34 and the primary draining port 36 extend in a same direction as the central vertical axis 26. Alternatively, it is noted that the primary filling port 34 and the primary draining port 36 can be eliminated or plugged as will be later described. The secondary filling port 38 and the secondary draining port 40 can extend in a direction generally parallel to a sealing member 142 as will be discussed hereinafter.

The nozzle 22 may further define a filling nozzle passageway 42 and a draining nozzle passageway 44 that extend in a same direction as the central vertical axis 26. The nozzle 22 can further define a connecting passageway 50 that fluidly connects the filling nozzle passageway 42 and the draining nozzle passageway 44. It is noted that all passageways discussed in this disclosure are not restricted to a certain size or shape unless expressly noted.

As shown in FIG. 7, the top wall 28 defines a number of fluid passageways including a piston raising passageway 30, a piston lowering passageway 32, a filing top wall passageway 46 and a draining top wall passageway 48, as will be discussed hereinafter. The top wall 28 can have a circular plate like construction and serve as a base onto which other components of the brake fill tool 10 may be attached by various methods. For example, the top wall 28 can have components bolted, welded, or glued thereto. Other methods of attachment are possible and contemplated. Further, although many of the components of the nozzle housing 20 are illustrated as being separate, it is understood that they could be integrally formed.

With continued reference to FIG. 7, the filling nozzle passageway 42 fluidly connects the primary filling port 34, the secondary filling port 38, and the filling top wall passageway 46. Further, the draining nozzle passageway 44 fluidly connects the primary draining port 36, the secondary draining port 40, and the draining top wall passageway 48.

As shown in FIGS. 3, 5, and 7, the manual clamping mechanism 60 is connected to the nozzle housing 20 for selectively clamping the nozzle housing 20 to the brake housing 12. The manual clamping mechanism 60 may be made of any number of metallic or polymer materials. Further, the manual clamping mechanism 60 may be made of a material that is resistant to corrosion due to the exposure of brake fluid. The manual clamping mechanism 60 can include a clamping jaw 62 which may be disposed as a set of four circumferentially spaced jaws 62 (two shown in FIGS. 3, 5 and 7) near an outer circumference of the brake fill tool 10. The clamping jaw 62 can define a clamping jaw pin bore 64. Further, the clamping jaw 62 may include a hook portion 66 and a pivot portion 68 disposed at opposite ends of the clamping jaw 62. The hook portion 66 can be used to positively engage the brake fill tool 10 to the lip 18 of the brake housing 12 as will be described hereinafter.

The manual clamping mechanism 60 can also include a clamping jaw actuator 70 which may be pivotably connected to the clamping jaw 62. The clamping jaw actuator 70 can be medially located with respect to the clamping jaw 62. The clamping jaw actuator 70 can define an actuator pin bore 72 and an actuator bore 74. The actuator pin bore 72 extends in a generally perpendicular direction to the nozzle 22 and is in registry with the clamping jaw pin bore 64. A jaw pin 92 extends through the clamping jaw pin bore 64 and the actuator pin bore 72 to allow the hook portion 66 to pivot toward and away from the nozzle 22. The actuator bore 74 allows for the passage of a piston 102 as will be discussed hereinafter. The clamping jaw actuator 70 can also include a contact post 76 as will be described during the discussion of the sealing mechanism 100. The contact post 76 can be a post that extends in a direction away from the top wall 28. Alternatively, the contact post 76 may be ring-shaped and extend in the direction away from the top wall 28. The contact post 76 contacts a pushing pin 166 as will be discussed hereinafter. The contact post 76 may have a circular or rectangular cross-section.

Figure 4:
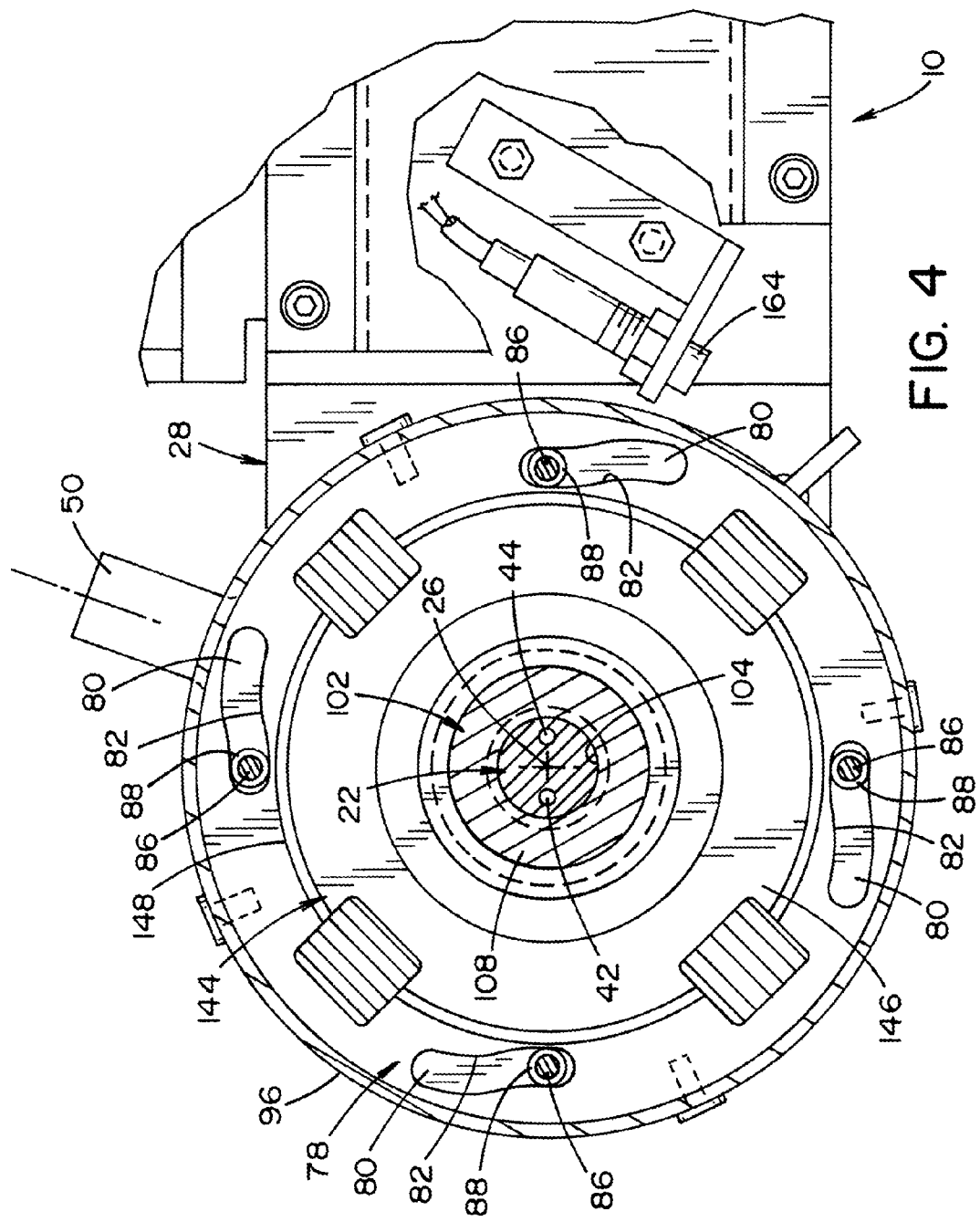
FIG. 4 is a sectional view taken along lines 4-4 of FIG. 3.

The manual clamping mechanism 60 can also include a cam ring 78 that can be connected to the top wall 28 of the nozzle housing 20. The cam ring 78 can have a donut shape. As shown in FIG. 4, the cam ring 78 can define a plurality of annular passages 80 and a cam ring bore 84. The annular passages 80 circumferentially extends around the cam ring 78 and each include a cam surface 82. The cam surface 82 is a varying distance or radius from the central vertical axis 26 along a circumference of the cam ring 78. The cam ring bore 84 allows for the passage of the piston 102 as described hereinafter.

With reference to FIGS. 1, 2, 4, and 6, the clamping mechanism 60 can further include an arm 50. The arm 50 may be connected to the cam ring 78 so as to allow rotation of the cam ring 78 as will be discussed hereinafter. It is noted that the arm 50 may be integral to the cam ring 78 or a separate component. The arm 50 extends radially outward from the cam ring 78 in a direction away from the nozzle 22.

Further, a guard 96 can be attached to the cam ring 78 and extends in the same direction as the nozzle 22 from the top wall 28. The guard 96 circumferentially surrounds at least a portion of the cam ring 78. The guard 96 may extend from the cam ring 78 to a distance so as to allow contact or near contact with the brake housing 12. This ensures that in the unlikely event of fluid leakage, fluid is not sprayed from the brake fill tool 10 onto nearby objects.

With continued reference to FIGS. 3, 5, and 7, the manual clamping mechanism 60 can further include a translating pin 86 with a ball end 88 and a jaw engaging end 90. The ball end 86 is received in the annular passage 80 of the cam ring 78.

The ball end 88 of the translating pin 86 can have a spherical-like shape. This spherical shape helps reduce the likelihood of galling or other surface-type damage to the ball end 88 during prolonged use of the brake fill tool 10. Although the translating pin 86 is shown to have a threaded connection to the clamping jaw 62, it is understood that these components could be combined into a single integral component. The ball end 88 can contact the cam surface 82 of the cam ring 78 so as to pivot the clamping jaw 62 about the jaw pin 92.

The pressurized sealing mechanism 100 is connected to the nozzle housing 20 for selectively sealing the nozzle housing 20 to the brake housing 12 after the manual clamping mechanism 60 clamps the nozzle housing 20 to the brake housing 12. Unless otherwise noted, the pressurized sealing mechanism 100 may be made of any number of metallic or polymer materials that provide sufficient strength to resist deformation. Further, the pressurized sealing mechanism 100 may be made of a material that is resistant to corrosion due to the exposure of brake fluid. The pressurized sealing mechanism 100 can include a piston 102. The piston 102 can have a donut-shaped cross-section and primarily extends along the vertical central axis 26. The piston 102 defines a piston bore 104 that coaxially receives the nozzle 22 along the central vertical axis 26 for slidable engagement.

The piston 102 can include a radially extending ear 106, an upper portion 108, and a lower portion 110. The upper portion 108 defines a middle annular groove 112 for receiving a middle retaining ring 114. The upper portion 108 also defines an upper annular groove 116 for receipt of an upper retaining ring 118. The upper portion 108 is medially disposed to the clamping jaw actuator 70 for slidable engagement. The lower portion 110 is medially disposed to a limit ring 132 for slidable engagement. The upper portion 108 has a greater outer diameter than the lower portion 110. Further, the lower portion 110 defines a lower annular groove 120 for receipt of a lower retaining ring 122. The retaining rings 114, 118, 122 can be commercially available retaining rings.

When the primary filling port 34 and the primary draining port 36 are eliminated as mentioned hereinbefore and the brake fill tool 10 is in either of the positions illustrated in FIG. 3 or 5, the secondary filling port 38 and the secondary draining port 40 are sealed by contact with the piston 102. Thus, the brake fill tool 10 may be evacuated to remove any fluid from the passageways 42, 44, 46, 48, 52 and ports 38, 40.

The diameter of the middle retaining ring 114 is greater than the actuator bore 74. Because the diameter of the upper portion 108 is larger than the diameter of the lower portion 110, the piston 102 is prevented from extending too far in a distance opposite the top wall 28. This prevents the brake fill tool 10 from being damaged due to over extension of the components.

The pressurized sealing mechanism 100 can also include a cap 124 with a holding portion 126 and a frustoconical portion 128. The holding portion 126 can have a uniform diameter as it extends along the central vertical axis 26. The frustoconical portion 128 increases in diameter as it extends from the holding portion 126 and away from the top wall 28. The cap 124 defines a cap bore 130 for coaxial and slidable receipt of the piston 102.

The pressurized sealing mechanism 100 can also include the limit ring 132. The limit ring 132 may also have a donut shape cross-section. The limit ring 132 defines a limit ring bore 134 which coaxially and slidably receives the piston 102 and an annular gasket groove 136. The limit ring 132 includes a sealing member contact portion 138 that faces towards the frustoconical portion 128. The limit ring bore 134 has a smaller diameter than the diameter of the lower retaining ring 122.

The annular gasket groove 136 can receive a gasket 168. The gasket 168 allows the brake fill tool 10 to contact the brake housing 12 without causing damage to the neck 14. The gasket 168 is circular in shape and may be made of any number of materials which prevent damage or reduce the transmission of vibration and/or force to the brake fill tool 10. For example, the gasket 168 can be made of an elastomeric compound or cork material. Further, the gasket 168 may be made of a material that is resistant to corrosion caused by brake fluid.

The limit ring 132 also defines a pushing pin bore 140 for slidable passage of a pushing pin 166. The pushing pin 166 is threadingly engaged with the cap 124 at a first end of the pushing pin 166 and includes a head at an opposite end of the pushing pin 166. The pushing pin 166 may have a smooth shaft that extends between the threads and the head to promote sliding of the pushing pin 166 through the pushing pin bore 140.

The pressurized sealing mechanism 100 can further include a sealing member 142 that is disposed on the cap 124. The sealing member 142 can also have a donut shape cross-section. The sealing member 142 may be made of any material that is flexible and allows for sealing engagement with the brake housing 12. The material used to make the sealing member 142 may be resistant to corrosion caused by exposure to brake fluid. Further, the material of the sealing member 142 may be resistant to expansion from the exposure to brake fluid. For example, the sealing member 142 could be made of an elastomeric compound or cork. The sealing member 142 contacts the inner diameter 16 of the neck 14 of the brake housing 12.

As the frustoconical portion 128 increases in diameter as it extends away from the top wall 28, the sealing member 142 will increase in outer diameter as it is vertically moved along the cap 124 away from the top wall 28. Accordingly, the outer diameter of the sealing member 142, and thus of the brake fill tool 10, can be varied depending upon the vertical location of the sealing member 142. This allows the brake fill tool 10 to be used on a variety of filling/draining applications which require different diameters for proper sealing.

With continued reference to FIGS. 3, 5, and 7, the pressurized sealing mechanism 100 may also include a cup member 144. The cup member 144 can have a floor portion 146 and a side wall portion 148. The floor portion 146 defines a floor bore 150 that coaxially receives the piston 102 for slidable engagement. The floor portion 146 is radially disposed between the ear 106 of the piston 102 and the clamping jaw actuator 70. The side wall portion 148 is disposed radially between the cam ring 78 and the nozzle 22. The cup member 144 further defines a cup member passageway 152.

Figure 8:
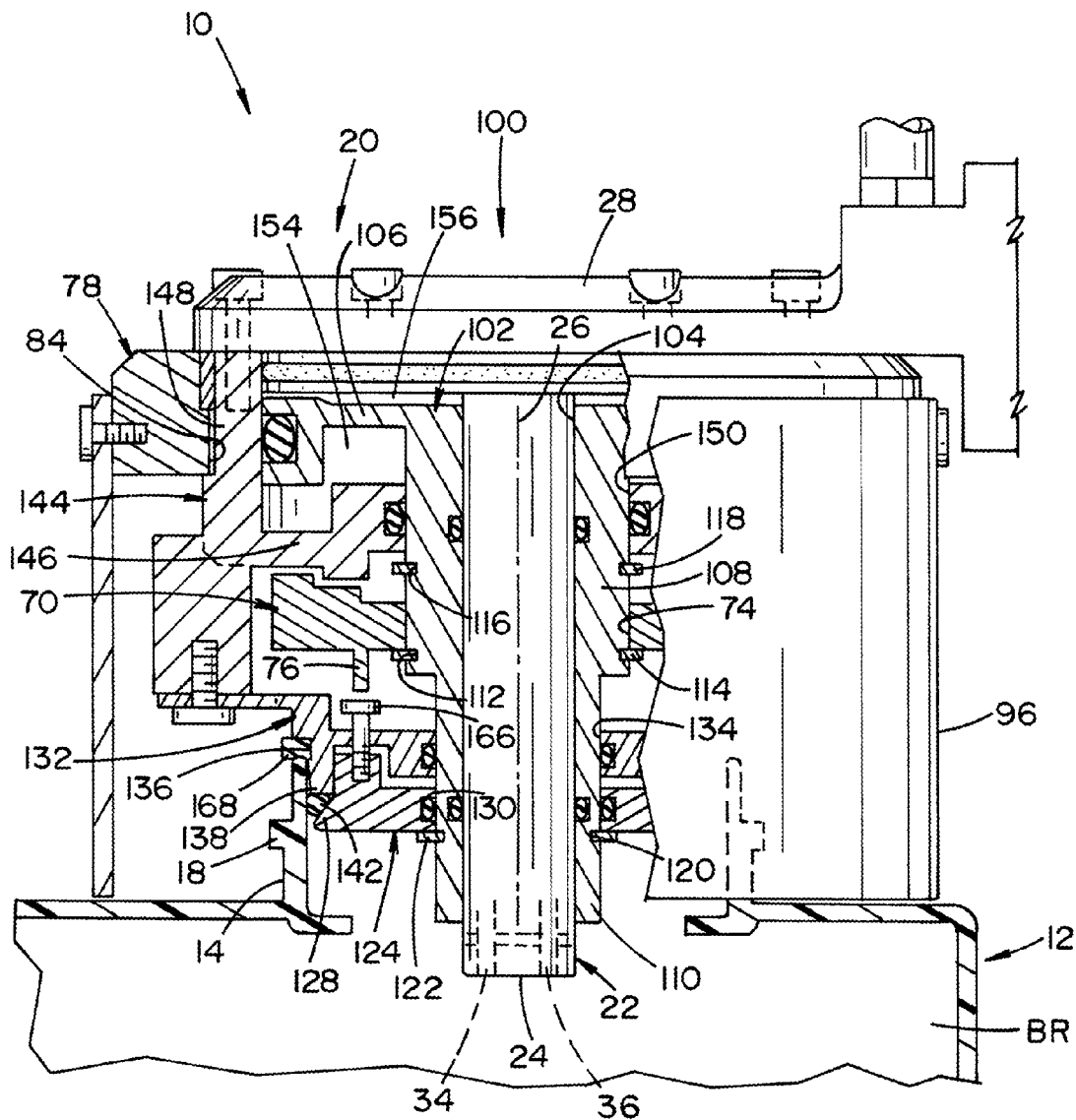
FIG. 8 is a partial sectional view of the brake fill tool rotated forty-five degrees relative to the sectional view of FIG. 7.

Attention is now directed to FIG. 8. FIG. 8 is a sectional view of the brake fill tool 10 and the brake housing 12. However, the section is not through the nozzle 22 so as to illustrate other components not readily apparent from the other views. In particular, the cup member 144 is attached to the limit ring 132 and the top wall 28, thus forming a rigid assembly.

A first chamber 154 is defined by the piston 102, the side wall portion 148 of the cup member 144, and the floor portion 146 of the cup member 144. The first chamber 154 is fluidly connected to the piston raising passageway 30 of the nozzle housing 20.

A second chamber 156 is defined by the piston 102, the top wall 28, the side wall portion 148 of the cup member 144, and the nozzle 22. The second chamber 156 is fluidly connected to the piston lowering passageway 32 of the nozzle housing 20 by the cup member passageway 152.

The piston 102 is moved along the central vertical axis 26 due to pressure differentials between the first chamber 154 and the second chamber 156. The pressure differential between the chambers 154, 156 may be accomplished in a variety of ways. For example, fluid can be introduced into one chamber to cause movement of the piston 102. Alternatively, fluid can be removed from a chamber to cause movement of the piston 102. It is also possible to add fluid to one chamber while simultaneously removing fluid from the other chamber.

In particular, when fluid pressure in the first chamber 154 is greater than fluid pressure in the second chamber 156, the piston 102 moves in a direction toward the top wall 28 of the nozzle housing 20. Alternatively, the piston 102 is moved along the central vertical axis 26 away from the top wall 28 when the fluid pressure in the second chamber 156 is greater than fluid pressure in the first chamber 154.

Figure 2:
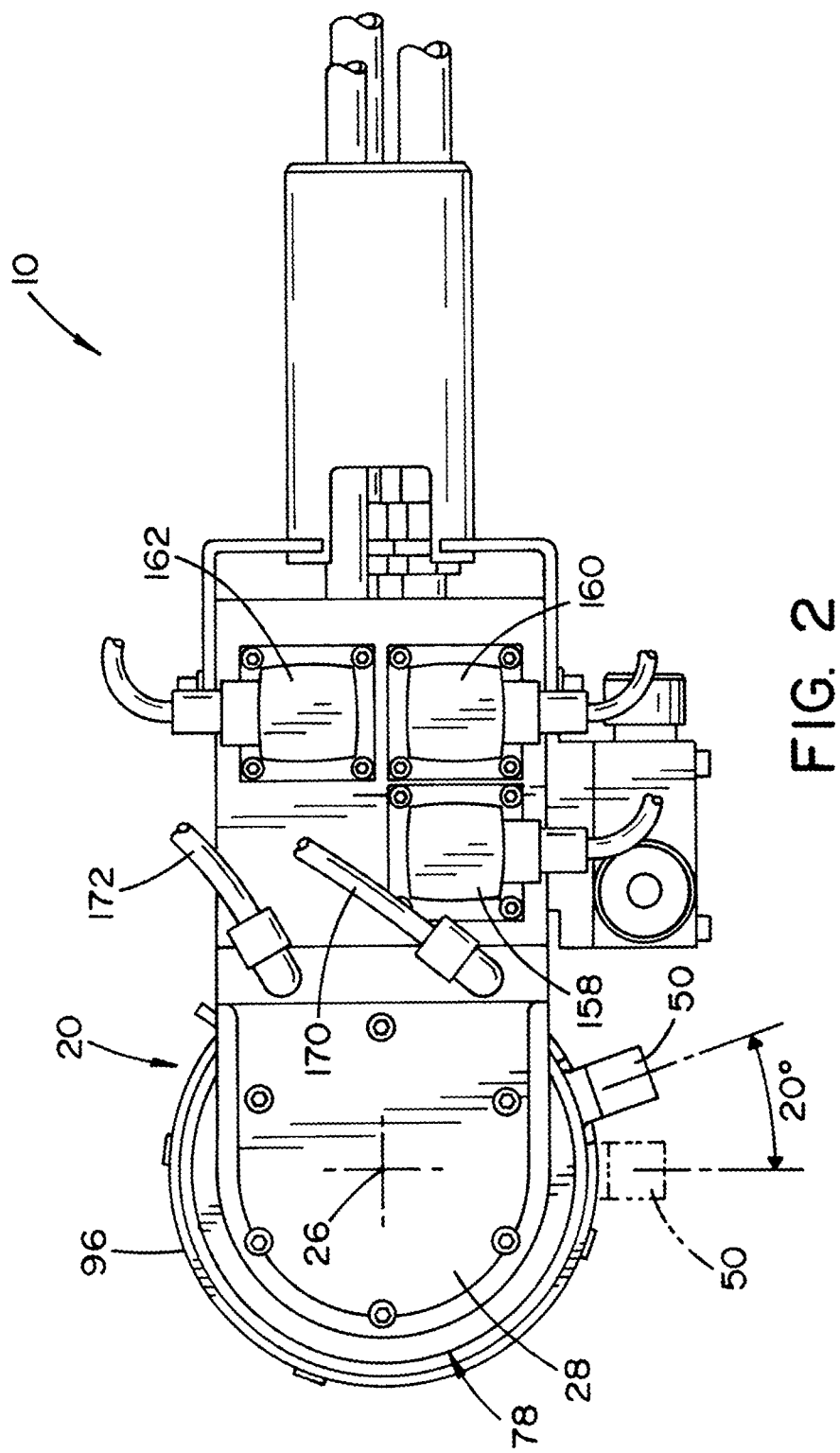
FIG. 2 is a plan view of the brake fill tool.

With reference to FIG. 2, the brake fill tool 10 can also include a first solenoid 158, a second solenoid 160, and a third solenoid 162. The solenoids 158, 160, 162 are commercially available solenoids that can selectively allow the passage of fluid. These solenoids 158, 160, 162 are used to supply and remove fluid from the brake housing 12 via the filling nozzle passageway 42 and the draining nozzle passageway 44. Specifically, the first solenoid 158 allows fluid to be provided to the first nozzle passageway 42 from an exterior tank (not shown). The second solenoid 160 allows for fluid to be removed from the brake housing 12 through the draining passageway 44 and be emptied into a separate tank (not shown). The third solenoid 162 allows for a vacuum to be drawn to remove exterior air from the brake housing 12. As would be understood to one skilled in the art, the third solenoid 162 would be fluidly connected to a rough and/or fine vacuum pump (not shown).

Figure 6:
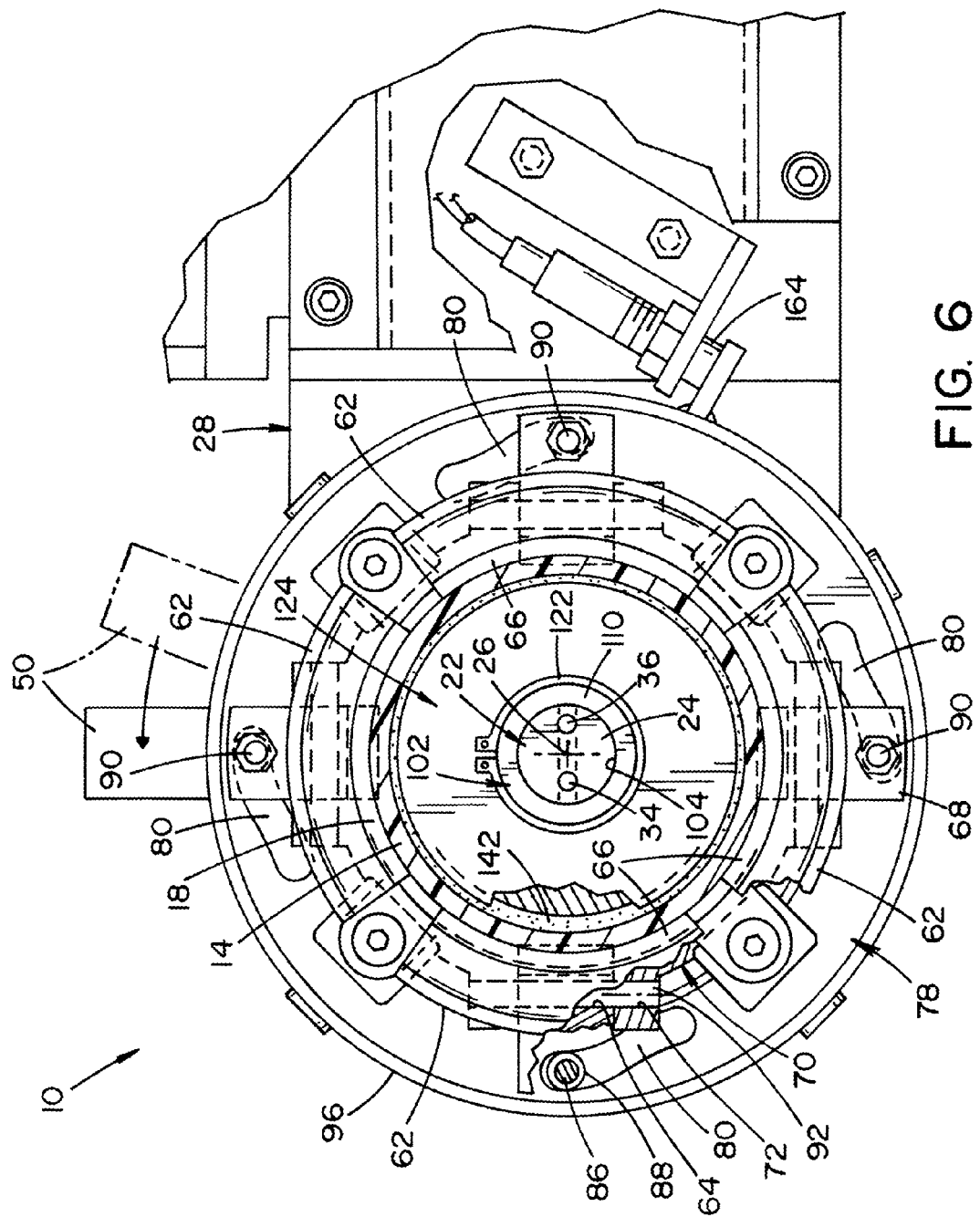
FIG. 6 is a sectional view taken along lines 6-6 of FIG. 5.

As shown in FIGS. 1, 4, and 6, the brake fill tool 10 can include a sensor 164. As illustrated, the sensor 164 is located near an end of the brake fill tool 10 opposite the top wall 28. However, other locations are possible and contemplated. The sensor 164 is used to determine the rotational orientation of the brake fill tool 10. Specifically, the sensor 164 can emit a signal to a computer (not shown) to indicate when the brake fill tool 10 has been adequately rotated to ensure that there is positive engagement/disengagement between the brake fill tool 10 and the brake housing 12. This helps prevent the possibility of leaks from the connection between the brake fill tool 10 and the brake housing 12. The sensor 164 can be a commercially available proximity type sensor or non-contact type sensor.

With particular reference to FIG. 2, a rotation of approximately 20° of the arm 50 will typically change the status of the brake fill tool 10. More particularly, the brake fill tool 10 status will be changed from unclamped to clamped or from clamped to unclamped.

As shown in FIG. 2, the brake fill tool 10 also includes an external raising line 170 and an external lowering line 172. The external raising line 170 is fluidly connected to the piston raising passageway 30 and the external lowering line 172 is fluidly connected to the piston lowering passageway 32. The external raising and lowering lines 170, 172 can be connected to separate fluid tanks (not shown).

Operation of the brake fill 10 will now be discussed. In FIG. 3, the brake fill tool 10 is shown in the unclamped position. In this position, a lowermost end of the piston 102 and the free end 24 of the nozzle 22 are offset an equal distance from the top wall 28. Further, the sealing member 142 is located on the holding portion 126 of the cap 124. The clamping jaw 62 of the manual clamping mechanism 60 is pivoted outwardly away from the neck 14 of the brake housing 12 to allow for initial passage of the clamping jaw 62 over the neck 14.

With reference to FIG. 5, the brake tool 10 is shown in the clamped position. In this position, the brake fill tool 10 has been rotated approximately 20 degrees (as shown in FIG. 2.), thereby causing contact between the cam surface 80 and the ball end 88 of the translating pin 86. Because of this contact, the hook portion 66 of the clamping jaw 62 is rotated about the jaw pin 92. Thus, the hook portion 66 more closely approaches the neck 14 of the brake housing 12. In this position, the hook portion 66 is closer to the neck 14. However, it is noted that the hook portion 66 is not required to physically contact the neck 14. Thus, the amount of twisting force that must be supplied by the operator can be reduced. In this position, the free end 24 of the nozzle 22 and the lowermost edge of the piston 102 are still equally offset from the top wall 28. However, because the hook portion 66 has a smaller effective inner diameter than the lip 18 of the brake housing 12, a secure physical connection is ensured.

As shown in FIG. 7, the brake fill tool 10 is shown in the ready position. In this position, fluid has been supplied to the piston raising passageway 30 so as to transmit the fluid to the first chamber 154. By supplying fluid to the first chamber 154, the piston 102 travels along the central vertical axis 26 toward the top wall 28. This movement causes the lower retaining ring 122 to contact the cap 124 and move the cap 124 toward the top wall 28. This causes the sealing member 142 to contact the contact portion 138 of the limit ring 132. Thus, the sealing member 142 travels away from the top wall 28, thereby increasing the effective outer diameter of the sealing member 142 of the brake fill tool 10. Thus, the outer sealing diameter of the brake fill tool 10 can be varied depending upon the vertical location of the sealing member 142 on the cap 124. Further, the middle retaining ring 114 contacts the clamping jaw actuator 70 and causes the clamping jaw actuator 70 to travel toward the top wall 28. Because the clamping jaw 62 is joined to the clamping jaw actuator 70, the clamping jaw 62 also moves toward the top wall 28.

To transfer the brake fill tool 10 from the ready position to the clamped position and then subsequently the unclamped position, reference is initially made to FIG. 7 and FIG. 5. By supplying fluid to the second chamber 156, the piston 102 will travel in a direction along the central vertical axis 26 away from the top wall 28. This movement will cause the upper retaining ring 118 to contact the clamping jaw actuator 70 and force the clamping jaw actuator 70 away from the top wall 28. When the clamping jaw actuator 70 moves downwardly, the contact post 76 of the clamping jaw actuator 70 biases the pushing pin 166 away from the top wall 28. As the pushing pin 166 slidingly passes through the pushing pin bore 140 of the limit ring 132, the limit ring 132, along with the nozzle housing 20 remains stationary, but the cap 124 travels away from the top wall 28.

Next, a comparison between FIG. 5 and FIG. 3 is presented to discuss the change of the brake fill tool 10 from clamped to unclamped. Rotation of the brake fill tool 10 allows for the cam ring 78 to rotate and thereby cause outward pivoting of the clamping jaw 62. This allows the brake fill tool 10 to be removed from the brake housing 12.

Figure 9:
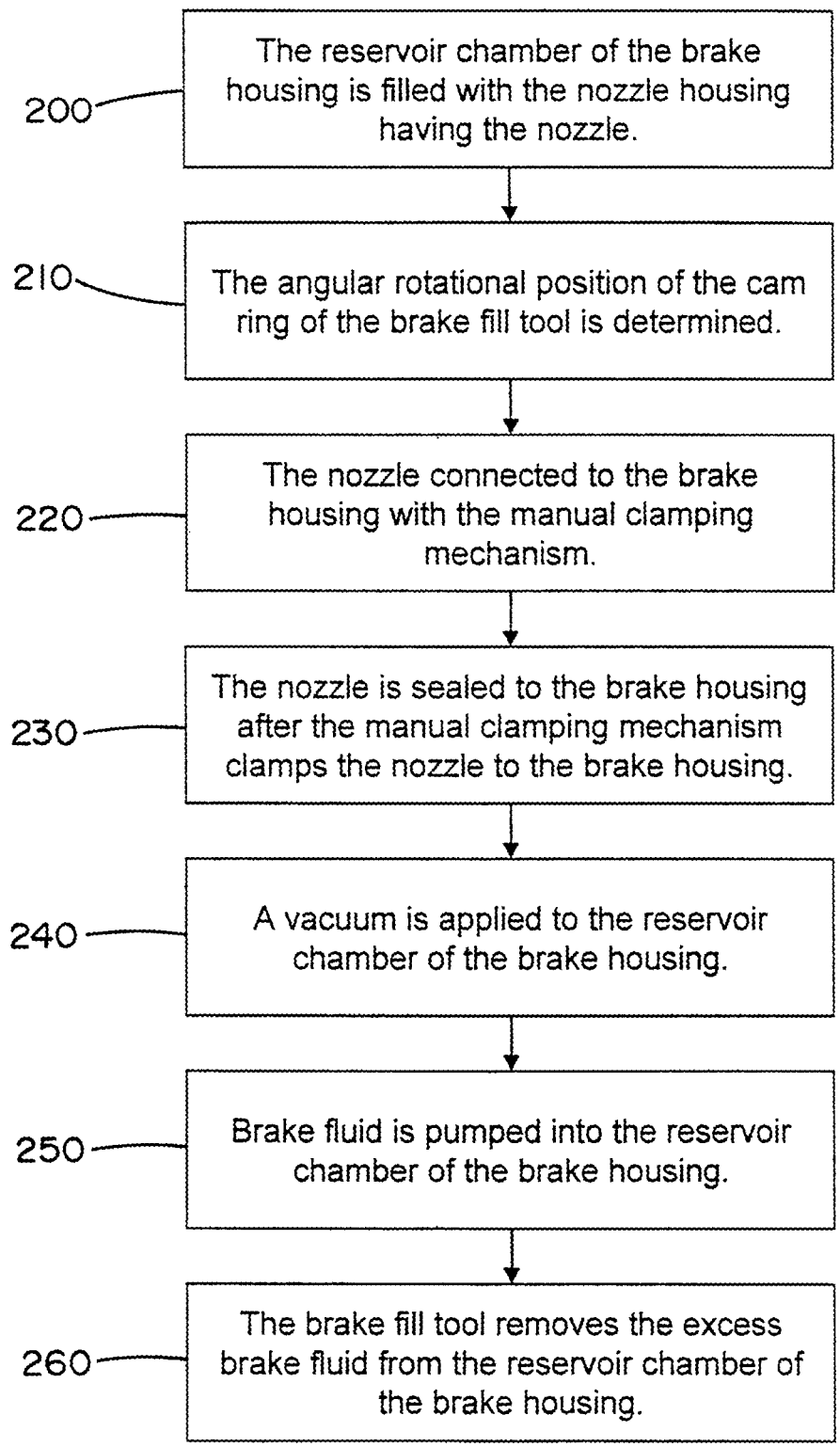
FIG. 9 is a flow chart illustrating a method of clamping and filling the brake housing.

With reference to FIG. 9, a method of filling the brake housing 12 with the brake fill tool 10 will now be discussed. In 200, the reservoir chamber of the brake housing 12 is filled with the nozzle housing 20 having the nozzle 22. In 210, the angular rotational position of the cam ring 78 of the brake fill tool 10 is determined. In 220, the nozzle 22 is connected to the brake housing 12 with the manual clamping mechanism 60. In 230, the nozzle 22 is sealed to the brake housing 12 with the pressurized sealing mechanism 100 after the manual clamping mechanism 60 clamps the nozzle 22 to the brake housing 12. In 240, a vacuum is applied to the reservoir chamber of the brake housing 12. In 250, brake fluid is pumped into the reservoir chamber of the brake housing 12. During 250, the reservoir chamber and the entire braking system of the vehicle (not shown) may be overfilled with brake fluid. Specifically, an amount of brake fluid may be supplied to the reservoir chamber and the braking system that is greater than is what is needed for safe and proper operation of the vehicle. During 250, the reservoir chamber may be pressurized to approximately 80 lbs/in$^2$. In 260, the brake fill tool 10 removes the excess brake fluid from the reservoir chamber of the brake housing 12 so that there is an adequate amount of brake fluid in the reservoir chamber and brake system for safe and proper operation of the vehicle, commonly known as a "full" condition. While, for purposes of simplicity of explanation, the method has steps shown and described as executing serially, it is to be understood and appreciated that the present invention is not limited by the illustrated order, and some steps could occur in different orders and/or concurrently with other steps from that shown and described herein.

It will be appreciated that the above-disclosed and other features and functions, or alternatives or varieties thereof, may be desirably combined into many other different systems or applications. Also, presently unforeseen or unanticipated alternatives, modifications, variations or improvements therein may be subsequently made by those skilled in the art which are also intended to be encompassed by the following claims.

The invention claimed is:

1. A brake fill tool for filling a brake housing in a braking system on a vehicle, comprising:
    a nozzle housing having a nozzle for filling a reservoir chamber of the brake housing;
    a manual clamping mechanism connected to the nozzle housing for selectively clamping the nozzle to the brake housing; and
    a pressurized sealing mechanism connected to the nozzle housing for selectively sealing the nozzle to the brake housing after the manual clamping mechanism clamps the nozzle to the brake housing,
    wherein the pressurized sealing mechanism includes:
    a piston defining a piston bore that slidably moves over the nozzle along a central vertical axis defined by the nozzle;
    a cap defining a cap bore that slidably receives the piston, and
    a sealing member disposed on the cap and adapted for sealing contact with an inner diameter of the brake reservoir, wherein the sealing member defines an outer sealing diameter of the brake fill tool which is translated radially as the sealing member travels along the central vertical axis.

2. The brake fill tool of claim 1 wherein the nozzle housing includes a top wall and the nozzle includes a free end adapted to discharge brake fluid into the brake reservoir.

3. The brake fill tool of claim 2 wherein the manual clamping mechanism includes:
    a translating pin including a ball end and a jaw engaging end;
    a clamping jaw including a hook portion adapted for engagement with the brake reservoir and a pivot portion connected to the jaw engaging end of the translating pin;
    a clamping jaw actuator pivotably connected to the clamping jaw, the clamping jaw actuator defining an actuator bore; and
    a cam ring connected to the top wall, the cam ring defining an annular passage that receives the ball end of the translating pin and a cam ring bore.

4. The brake fill tool of claim 1 wherein the
    cap including a holding portion and a frustoconical portion, the frustoconical portion increasing in diameter as the frustoconical portion extends from the holding portion and toward the brake housing.

5. The brake fill tool of claim 4 wherein the pressurized sealing mechanism further includes:
    a limit ring defining a limit ring bore that slidably receives the piston, the limit ring including a sealing member contact portion facing the frustoconical portion of the cap that contacts the sealing member and prevents movement of the sealing member away from the brake housing past the limit ring.

6. The brake fill tool of claim 5, the piston including an upper portion that slidingly engages the clamping jaw actuator and a lower portion that slidingly engages the limit ring and the cap, wherein the upper portion of the piston has a larger diameter than the lower portion of the piston.

7. The brake fill tool of claim 6, the lower portion of the piston defining a lower annular groove that receives a lower retaining ring, the upper portion of the piston defining a middle annular groove that receives a middle retaining ring and an upper annular groove that receives an upper retaining ring, wherein the lower retaining ring has an outer diameter greater than the limit ring bore and the middle retaining ring has an outer diameter greater than the actuator bore.

8. The brake fill tool of claim 4, further comprising
    a cup member including a floor portion and a side wall portion, the floor portion being disposed between a radially extending ear of the piston and the clamping jaw actuator and the side wall portion being radially disposed between the cam ring and the nozzle, wherein the piston, the side wall portion of the cup member, and floor portion of the cup member cooperate to define a first chamber, and the piston, the top wall of the nozzle housing, the side wall portion of the cup member, and the nozzle cooperate to define a second chamber, and wherein the piston is moved along the central vertical axis toward the top wall of the nozzle housing when fluid pressure in the first chamber is greater than fluid pressure in the second chamber and the piston is moved along the central vertical axis away from the top wall of the nozzle housing when fluid pressure in the second chamber is greater than fluid pressure in the first chamber.

9. The brake fill tool of claim 7, the limit ring further defining a pushing pin bore and the clamping jaw actuator including a contact post extending toward the pushing pin bore from a side of the clamping jaw actuator opposite the top wall.

10. The brake fill tool of claim 9, further including a pushing pin threadingly connected to the holding portion of the cap and slidingly extending through the pushing bore, wherein the pushing pin contacts the contact post of the clamping jaw actuator when the lower retaining ring in the lower annular groove of the piston is at a maximum distance from the top wall of the nozzle housing.

11. The brake fill tool of claim 5, the limit ring defining an annular gasket groove that receives a gasket adapted to contact a top lip of the brake reservoir.

12. The brake fill tool of claim 3, further including a guard attached to the cam ring and extending in a same direction as the nozzle so as to circumferentially surround at least a portion of the cam ring.

13. The brake fill tool of claim 3, the annular passage of the cam ring including a cam surface that engages the ball end of the translating pin, wherein the cam surface of the annular passage has a varying radius from the central vertical axis along a circumference of the cam ring.

14. The brake fill tool of claim 4, the clamping jaw defining a clamping jaw pin bore extending generally perpendicular to the piston and the clamping jaw actuator further defining an actuator pin bore extending generally perpendicular to the nozzle, wherein the clamping jaw pin bore and the actuator pin bore are in registry.

15. The brake fill tool of claim 4, further including a jaw pin extending through the clamping jaw pin bore and the actuator pin bore to allow the jaw engaging end to pivot toward the piston.

16. The brake fill tool of claim 5, a free end of the nozzle including a primary filling port and a primary draining port extending along a portion of a central vertical axis and a secondary filling port and a secondary draining port extending in a direction generally parallel to the sealing member contact portion, the nozzle defining a filling nozzle passageway and a draining nozzle passageway extending along the central vertical axis, a top wall defining a filling top wall passageway and a draining top wall passageway, wherein the filling nozzle passageway fluidly connects the primary and secondary filling ports to the filling top wall passageway and the draining nozzle passageway fluidly connects the primary and secondary draining ports to the draining top wall passageway.

17. A method of filling a brake housing with a brake fill tool, comprising:
    filling a reservoir chamber of the brake housing with a nozzle housing having a nozzle;
    connecting the nozzle to the brake housing with a manual clamping mechanism;
    sealing the nozzle to the brake housing after the manual clamping mechanism clamps the nozzle to the brake housing,
    determining an angular rotational position of a cam ring of the brake fill tool;
    applying a vacuum to the reservoir chamber with the brake fill tool; and
    pumping brake fluid into the reservoir chamber.

18. A brake fill tool for filling a brake housing in a braking system on a vehicle, comprising:
    a nozzle housing having a nozzle for filling a reservoir chamber of the brake housing, the nozzle housing including a top wall and the nozzle including a free end adapted to discharge brake fluid into the brake reservoir, the nozzle defining a central vertical axis;
    a manual clamping mechanism connected to the nozzle housing for selectively clamping the nozzle to the brake housing, wherein the manual clamping mechanism includes:
        a translating pin including a first end and a second end,
        a clamping jaw including a hook portion adapted for engagement with the brake reservoir and a pivot portion connected to the second end of the translating pin,
        a clamping jaw actuator pivotably connected to the clamping jaw, and
        a cam ring connected to the top wall, the cam ring defining an annular passage that receives the first end of the translating pin; and
    a pressurized sealing mechanism connected to the nozzle housing for selectively sealing the nozzle to the brake housing after the manual clamping mechanism clamps the nozzle to the brake housing.

19. The brake fill tool of claim 18, wherein the pressurized sealing mechanism includes:
    a piston defining a piston bore that slidably moves over the nozzle, the piston extending through both an actuator bore of the actuator and a cam ring bore of the cam ring;
    a cap defining a cap bore that slidably receives the piston, and
    a sealing member disposed on the cap and adapted for sealing contact with an inner diameter of the brake reservoir, wherein the sealing member defines an outer sealing diameter of the brake fill tool which is translated radially as the sealing member travels along the central vertical axis.

* * * * *